W. J. LATTIMER.
ATTACHMENT FOR THRESHING MACHINES.
APPLICATION FILED APR. 8, 1911.
1,007,297.
Patented Oct. 31, 1911.
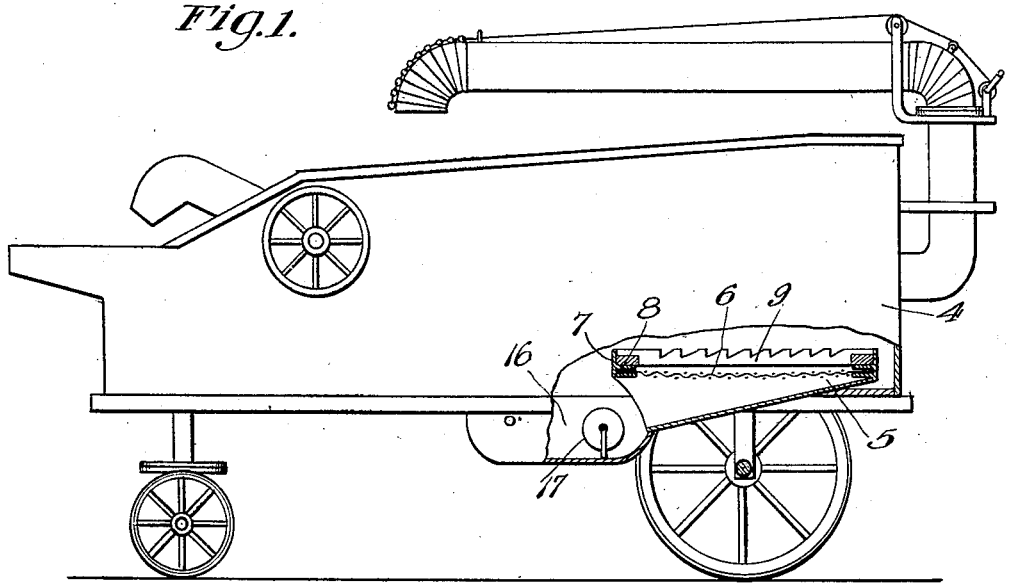
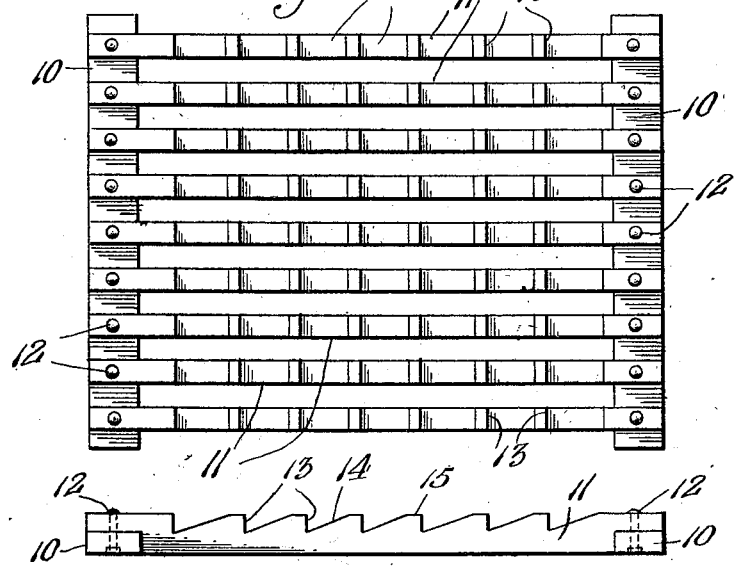
WITNESSES
INVENTOR
William Joseph Lattimer,
by Shanks Appleman, Attorney

UNITED STATES PATENT OFFICE.

WILLIAM JOSEPH LATTIMER, OF WORTH, MISSOURI.

ATTACHMENT FOR THRESHING-MACHINES.

1,007,297.  Specification of Letters Patent.  Patented Oct. 31, 1911.

Application filed April 8, 1911. Serial No. 619,878.

*To all whom it may concern:*

Be it known that I, WILLIAM JOSEPH LATTIMER, a citizen of the United States of America, and resident of Worth, in the county of Worth and State of Missouri, have invented certain new and useful Improvements in Attachments for Threshing-Machines, of which the following is a specification.

This invention relates to threshing machines and particularly to a device intended to act as a chaffer to prevent chaff or straw from gaining access to the screens by which the grain is separated and impairing the utility of the screen by filling the meshes thereof.

An object of this invention is to provide a chaffer supported in such relation to the screens for separating the grain from chaff and other foreign substances for the said chaffer will prevent the entrance of foreign substances such as wet chaff or straw to the screen thereby guarding the screen in the manner stated and increasing the efficiency and utility of the screen with which the chaffer coacts.

A still further object of this invention is to provide a chaffer which will serve to permit movement of the chaff longitudinally of the casing of the machine in order that the said chaff may find its way to the rear end thereof and to the elevator or conveyer which removes the chaff and straw from the machine.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a threshing machine broken away to show the relation of the chaffer to the screen and to the grain conveyer; Fig. 2 illustrates a top plan view of the chaffer; Fig. 3 illustrates a side elevation of the chaffer.

In these drawings I have illustrated a threshing machine 4 which may be of any ordinary construction and I will not, therefore, describe the same in detail, except as is necessary to show the relation of the improvement to threshing machines which are now in common use.

The grain pan 5 may be of any ordinary type guarded by a screen 6 which is supported in a frame 7 which frame is also provided with a flange 8 to contain the chaffer 9 which chaffer comprises two sill-like members 10 to which the longitudinally disposed and parallel arranged chaffer bars 11 are secured at their ends by means of the fastening members 12 which may be in the form of rivets or bolts to suit the ideas of the manufacturer.

The chaffer bars 11 are shown as having a series of shoulders 13 at right angles to the length of the chaffer bars. The upper edges of the chaffer bars are further provided with a series of inclined portions 14 which extend from the bottom of one shoulder to a point near the upper edge of the next succeeding shoulder, the portion between the inclined portion and the shoulder being horizontal as shown at 15. Each chaffer bar is therefore divided into a series of shoulders and inclined surfaces with interposed straight portions forming serration like projections which are adapted to engage chaff and straw for the purpose of permitting the said chaff and straw to travel rearwardly out of contact with the screen 6 so that the said chaff and straw may not clog the meshes of the screen 6 and impair its utility.

The fact that the bars extend parallel and longitudinally of the direction of travel of the straw and chaff within the machine as it progresses from the forward or feeding end thereof does not impede the progress of the said straw and chaff but on the other hand aids in its travel in the desired direction.

A pan 5 is here shown as discharging into a trough 16 containing a conveyer 17 by which the grain is carried laterally for the purpose of bagging as in machines now commonly made.

I claim—

In combination with a threshing machine, a grain pan, said grain pan having upwardly extending flanges, laterally extending flanges provided on said upwardly extending flanges, a grain screen, said grain screen adapted to be supported by said laterally extending flanges, and adapted to cover the entire space provided therebetween, chaffer bars supported directly above said screen and covering the entire space between said upwardly extending flanges, and said parts being arranged to form a guard for excluding foreign substances.

In testimony whereof, I affix my signature in the presence of two witnesses.

WILLIAM JOSEPH LATTIMER.

Witnesses:
ALEX W. KELSO,
EDWARD KELSO.

Copies of this patent may be obtained for five cents each, by addressing the "Commissioner of Patents, Washington, D. C."